United States Patent
Yang et al.

(10) Patent No.: US 7,443,586 B2
(45) Date of Patent: Oct. 28, 2008

(54) DISPLAY DEVICE USING SINGLE-PANEL DIFFRACTIVE LIGHT MODULATOR

(75) Inventors: Haeng Seok Yang, Bucheon-si (KR); Sung Kyong Oh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 11/693,632

(22) Filed: Mar. 29, 2007

(65) Prior Publication Data
US 2007/0229935 A1    Oct. 4, 2007

(30) Foreign Application Priority Data
Mar. 30, 2006    (KR) .................. 10-2006-0029011

(51) Int. Cl.
G02B 27/42 (2006.01)
G02B 26/08 (2006.01)
G03B 21/26 (2006.01)
G03B 21/14 (2006.01)

(52) U.S. Cl. ............. 359/558; 359/212; 359/215; 359/224; 359/567; 359/568; 359/225; 359/226; 353/30; 353/34; 353/37; 353/69; 353/82

(58) Field of Classification Search ............. 359/558, 359/567, 568; 353/30, 34, 37, 69, 82
See application file for complete search history.

(56) References Cited

U.S. PATENT DOCUMENTS 5,311,360 A    5/1994    Bloom
7,248,408 B2 *    7/2007    Yun ........................ 359/567

* cited by examiner

Primary Examiner—Evelyn A. Lester
(74) Attorney, Agent, or Firm—Christensen O'Connor Johnson Kindness PLLC

(57) ABSTRACT

Disclosed herein is a display device using a single-panel diffractive light modulator. The display device includes a light source unit, a condensing unit, an illumination unit, a diffractive light modulator, a projection unit, a filter unit, and a distortion correcting means.

8 Claims, 4 Drawing Sheets

DISPLAY DEVICE USING SINGLE-PANEL DIFFRACTIVE LIGHT MODULATOR

CROSS REFERENCE TO RELATED APPLICATION

This application claims the benefit of Korean Patent Application No. 10-2006-0029011, filed on Mar. 30, 2006, entitled "Display System Using One Panel Optical Modulator", which is hereby incorporated by reference in its entirety into this application.

BACKGROUND OF THE INVENTION

1. Field of the Invention

The present invention relates generally to a display device using a single-panel diffractive light modulator and, more particularly, to a display device using a single-panel diffractive light modulator, in which a distortion correcting means is provided downstream of a projection unit, thus enabling correction of image distortion.

2. Description of the Related Art

With the development of microtechnology, Micro-Electro-Mechanical Systems (MEMS) devices and small-sized equipment, in which MEMS devices are assembled together, are attracting attention.

A MEMS device is formed on a substrate, such as a silicon substrate or a glass substrate, in microstructure form, and is a device in which an actuator for outputting mechanical actuating force and a semiconductor Integrated Circuit (IC) for controlling the actuator are electrically and mechanically combined with each other.

Recently, spatial light modulators using such MEMS devices have been developed. An example of such spatial light modulators is a Grating Light value (GLV) disclosed in U.S. Pat. No. 5,311,360 issued to Bloom et al., another example thereof is a light intensity conversion device for a laser display developed by Silicon Light Machine (SLM) Co., and still another example thereof is a diffractive light modulator developed by Samsung Electro-Mechanics Co. Display devices using such spatial light modulators are well known, and an example thereof is shown in FIG. 1.

FIG. 1 is a diagram showing the construction of a prior art display device using a single-panel diffractive light modulator.

Referring to FIG. 1, the prior art display device using a single-panel diffractive light modulator includes a light source unit 10, a condensing unit 12, an illumination unit 14, a diffractive light modulator 18, a Fourier filter unit 20, a projection unit 24, and a screen 28.

The light source unit 10 includes a plurality of light sources 11a~11c. In one application thereof, the light sources 11a~11c may be sequentially lit. The condensing unit 12 includes a mirror 13a and a plurality of dichroic mirrors 13b and 13c, and functions to cause light from the plurality of light sources to have a single light path by combining the light from the plurality of light sources 11a~11c.

The illumination unit 14 converts light, passed through the condensing unit 12, into linear collimated light, and causes the linear collimated light to be incident on the diffractive light modulator 18. The diffractive light modulator 18 generates linear diffracted light having a plurality of diffraction orders by modulating the incident light, and emits the linear diffracted light. In this case, diffracted light, which has a given diffraction order and is desired to be used in an application, is formed to vary in light intensity at respective locations thereof so that it forms images on the screen 28. That is, since the diffracted light created in the diffractive light modulator 18 is linear and the linear diffracted light may have different light intensity values at respective locations thereof, two-dimensional (2D) images can be formed when the diffracted light is scanned over the screen 28.

Meanwhile, the diffracted light generated by the diffractive light modulator 18 enters the Fourier filter unit 20. The Fourier filter unit 20 includes a Fourier lens 21 and a dichroic filter 22, and functions to separate the diffracted light according to diffraction order and to pass only diffracted light having a desired diffraction order therethrough.

Meanwhile, the projection unit 24 includes a projection lens 25 and a scanner 26. The projection lens 25 expands the incident diffracted light, while the scanner 26 forms images by projecting the incident diffracted light onto the screen 28.

Meanwhile, according to the above-described prior art, diffracted light is projected directly on the screen 28 by the projection unit 24, so that the projection distance from the scanner 16 to the center A of the screen 28 in a lateral direction (scanning direction) and the distance from the scanner 16 to each side edge A' of the screen 28 in the lateral direction are different, with the result that a distorted image is formed on the screen 28, as shown in FIG. 2A. In more detail, when, in FIG. 1, the projection distance from the scanner 26 to the center A of the screen 28 in the lateral direction is compared with the projection distance from the scanner 26 to the side edge A' of the screen 28, the projection distance for the side edge A' is longer than the other distance by distance a, therefore distortion occurs, as shown in FIG. 2A. When the screen 28 is viewed from the front thereof and an imaginary plane 28', defined by the same projection distance, is considered, as shown in FIG. 2B, it can be seen that a longer projection distance is required for diffracted light to reach the side edge A' of the screen 28 from the scanner 26. As a result, the diffracted light travels a longer projection distance, so that an image is vertically expanded, with the result that distortion shown in FIG. 2B occurs.

SUMMARY OF THE INVENTION

Accordingly, the present invention has been made keeping in mind the above problems occurring in the prior art, and an object of the present invention is to provide a display device using a single-panel diffractive light modulator that is capable of preventing the occurrence of image distortion when generating diffracted light by modulating incident light using the diffractive light modulator, and forming two-dimensional images by projecting the generated diffracted light on a screen.

In order to accomplish the above object, the present invention provides a display device using a single-panel diffractive light modulator, including a light source unit comprising a plurality of light sources for respectively emitting beams of light having respective wavelengths; a condensing unit for causing the beams of light, emitted from the plurality of light sources, to have an identical light path; an illumination unit for converting the light, emitted from the light sources of the light source unit, into linear light; a diffractive light modulator for generating diffracted light having a plurality of diffraction orders by modulating the linear light when the linear light enters from the illumination unit, so that diffracted light having at least one diffraction order, which will be used in an application, has light intensity values suitable for the application at respective locations thereof; a projection unit for projecting the diffracted light having a plurality of diffraction orders, emitted from the diffractive light modulator, onto the screen and generating images; a filter unit for passing diffracted light having at least one desired diffraction order, which is selected from the diffracted light having a plurality of diffraction orders and is used in the application, therethrough; and distortion correcting means for correcting image distortion that is caused upon projection of the diffracted light onto the screen by the projection unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
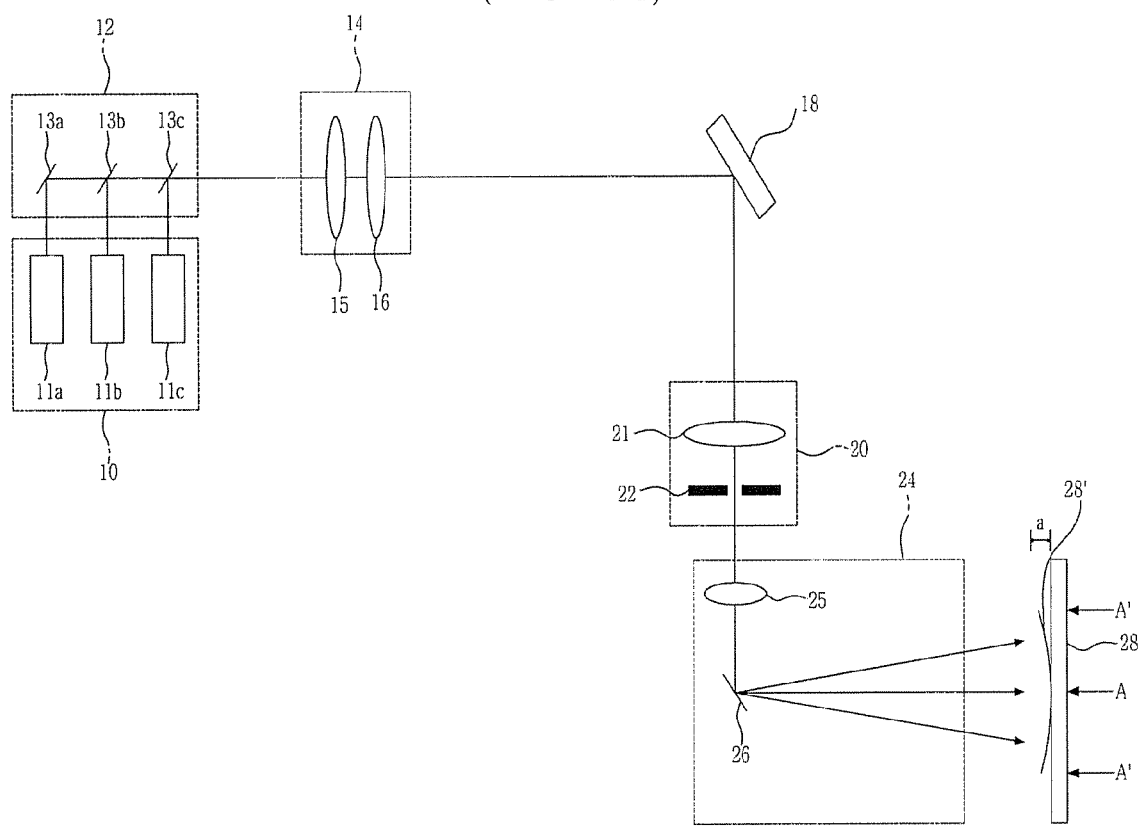
FIG. 1 is a diagram showing the construction of a prior art display device using a single-panel diffractive light modulator.
Figure 2A:
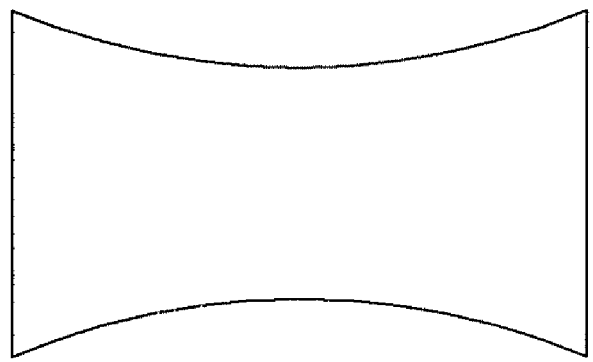
FIG. 2A is a view showing image distortion generated on the screen of FIG. 1.
Figure 2B:
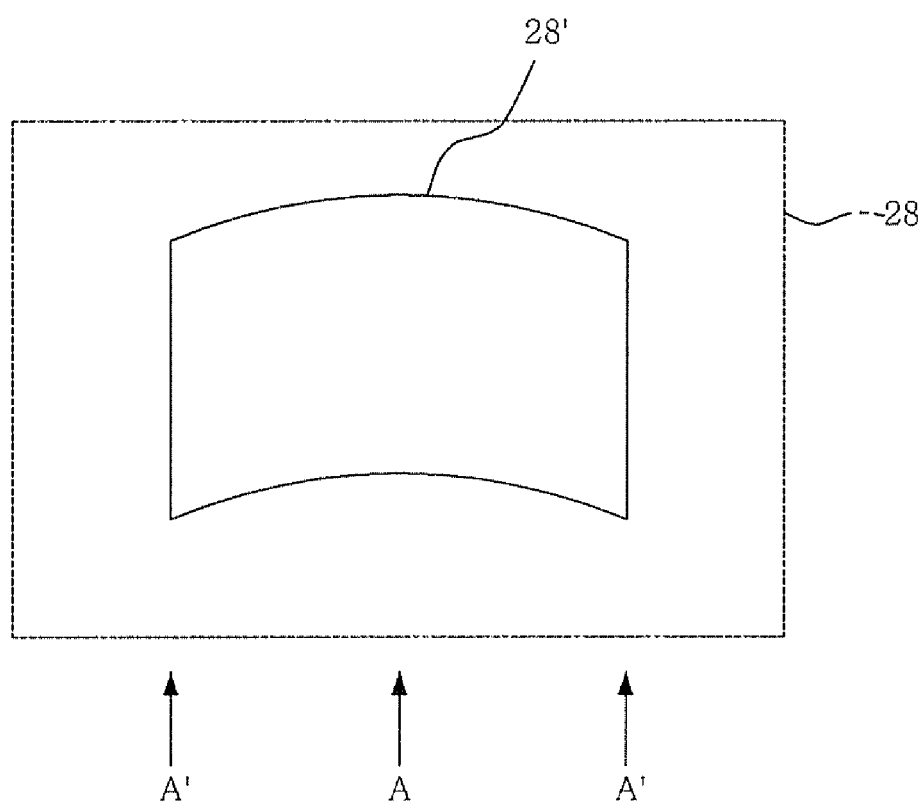
FIG. 2B is a view showing an imaginary plane defined by the same projection distance when the screen of FIG. 1 is viewed from the front thereof.

Reference now should be made to the drawings, in which the same reference numerals are used throughout the different drawings to designate the same or similar components.

Figure 3:
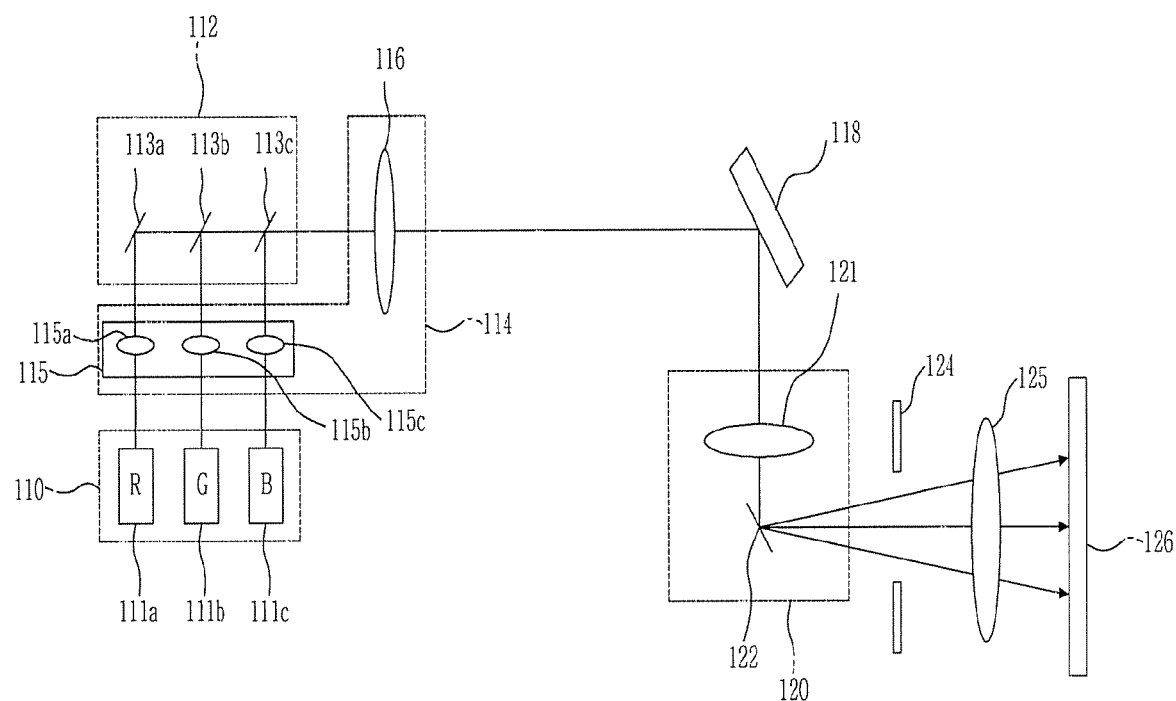
FIG. 3 is a diagram showing the construction of a display device using a single-panel diffractive light modulator according to an embodiment of the present invention.
Figure 4:
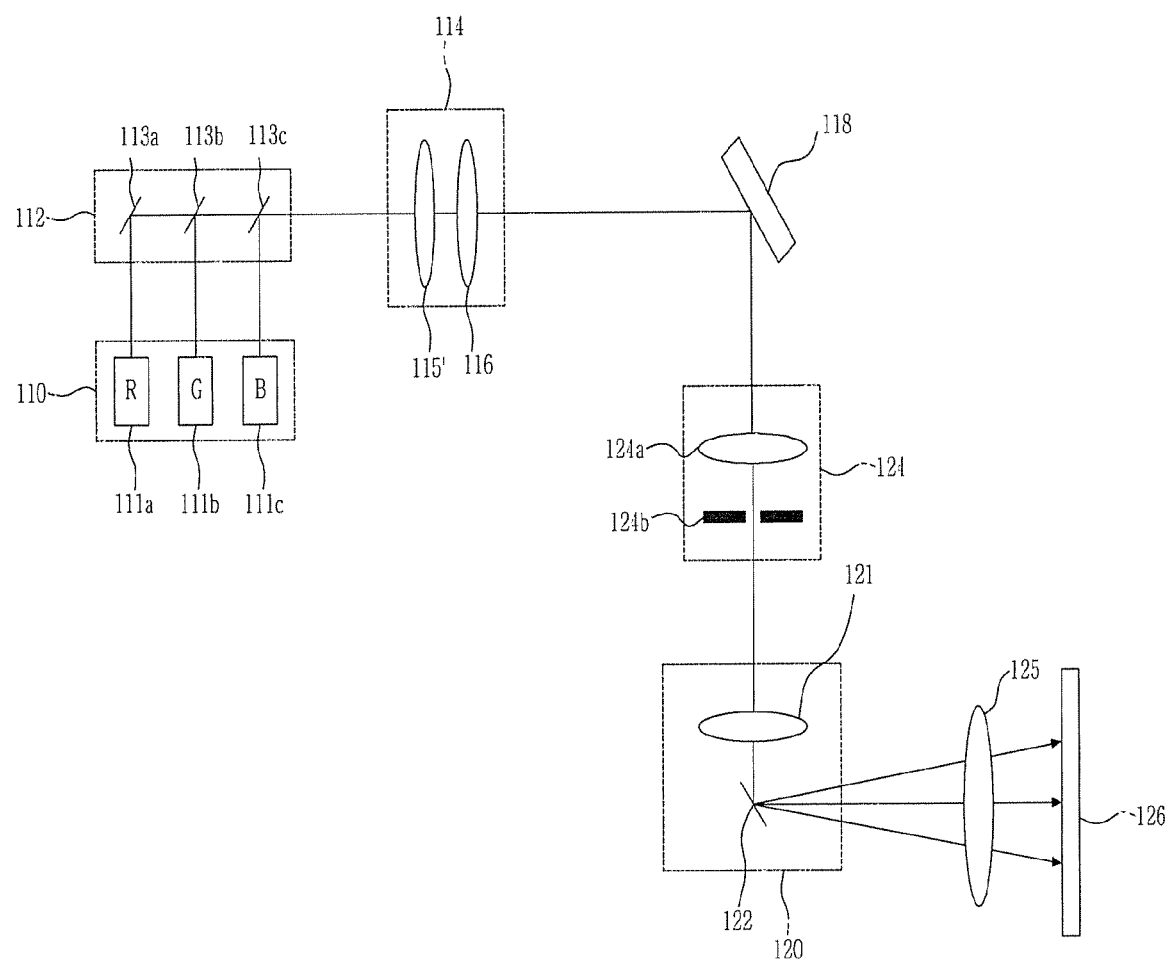
FIG. 4 is a diagram showing the construction of a display device using a single-panel diffractive light modulator according to another embodiment of the present invention.

With reference to FIGS. 3 and 4, a display device using a single-panel diffractive light modulator according to the present invention is described in detail below.

FIG. 3 is a diagram illustrating the construction of a display device using a single-panel diffractive light modulator according to an embodiment of the present invention.

Referring to FIG. 3, the display device using a single-panel diffractive light modulator according to the embodiment of the present invention includes a light source unit 110 for generating and emitting a plurality of beams of light, a condensing unit 112 for causing the plurality of beams of light, emitted from the light source unit 110, to have the same light path, an illumination unit 114 for converting the light, emitted from the condensing unit 112, into linear collimated light and causing the linear collimated light to enter a diffractive light modulator 118, the diffractive light modulator 118 for generating diffracted light having a plurality of diffraction orders by diffracting the light incident from the illumination unit 114 and emitting the diffracted light so that diffracted light having at least one diffraction order, which belongs to diffracted light having a plurality of diffraction orders, can form a desired image, a projection unit 120 for projecting the diffracted light having a plurality of diffraction orders, generated by the diffractive light modulator 118, onto the screen 126, and a filter unit 124 located between the projection unit 120 and the screen 126 and configured to pass diffracted light having a desired diffraction order therethrough.

The light source unit 110 includes a plurality of light sources, for example, a red light source 111a, a green light source 111b, and a blue light source 111c. Laser diodes or light emitting diodes may be used as the respective light sources 111a, 111b and 111c. In this case, if the light source unit 110 emits red light, green light and blue light in a time division manner in the case where a single-panel type is used, as in the present embodiment of the present invention, that is, in the case where a single diffractive light modulator 118 is used, there is no need to provide a separate color wheel (a device capable of time-dividing a multiple beam according to the color) upstream or downstream of the diffractive light modulator 118. Of course, if the light source unit 110 emits a plurality of beams of light at the same time, that is, if the light source unit 110 emits the beams without time division, a separate color wheel 117 is provided upstream or downstream of the diffractive light modulator 118, so that the plurality of beams of light does not enter the diffractive light modulator 118 simultaneously, but enters the diffractive light modulator 118 at different times.

The condensing unit 112 may include a single reflecting mirror 113a and two dichroic mirrors 113b and 113c in an embodiment, and causes a plurality of beams of light, emitted from the plurality of light sources 111a, 111b and 111c, to have the same light path. That is, the reflecting mirror 113a locates red light on a desired light path by changing the path of light emitted from the red light source 111a, the dichroic mirror 113b, located downstream of the reflecting mirror 113a, passes the red light therethrough, reflects green light, emitted from the green light source 111b, so that the red light and the green light are located on the same light path, and the dichroic mirror 113c, located downstream of the dichroic mirror 113b, passes the red light and the green light therethrough and reflects blue light emitted from the blue light source 111c, so that the red light, the green light and the blue light are located on the same light path.

Meanwhile, the collimating lens unit 115 of the illumination unit 114 is located between the light source unit 110 and the condensing unit 112. Here, the collimating lens unit 115 includes a plurality of collimating lenses 115a, 115b and 115c, and the collimating lenses 115a, 115b and 115c are located to correspond to the respective light sources 111a, 111b, and 111c of the light source unit 110 and convert divergent light, emitted from the respective light sources 111a, 111b and 111c, into collimated light.

The cylinder lens 116 of the illumination unit 114 is located downstream of the condensing unit 112, and the cylinder lens 116 converts the collimated light, emitted from the condensing unit 112, into linear light, and causes the linear light to enter the diffractive light modulator 118.

Although the embodiment of the present invention is constructed such that the collimating lens unit 115 of the illumination unit 114 is located between the light source unit 110 and the condensing unit 112 and the cylinder lens 116 is located downstream of the condensing unit 112, another embodiment, as illustrated in FIG. 4, may be constructed such that the collimating lens 115' of the illumination unit 114 is located downstream of the condensing unit 112. By doing so, desired collimated light can be generated using only a single collimating lens 115', compared to the case where collimated light is generated using the collimating lens unit 115 composed of the three collimating lenses 115a, 115b and 115c, as shown in FIG. 3. Accordingly, this results in a reduction in cost.

Thereafter, when linear collimated light enters from the illumination unit 114, the diffractive light modulator 118 generates diffracted light having a plurality of diffraction orders by performing light modulation and emits the diffracted light. Here, the diffracted light having a plurality of diffraction orders, emitted from the diffractive light modulator 118, is linear light from the point of view of respective diffraction orders.

Furthermore, diffracted light having a desired diffraction order, which belongs to the diffracted light having a plurality of diffraction orders emitted from the diffractive light modulator 118, and which is desired to be projected onto the screen 126 in order to form images, may be constructed to vary in light intensity at respective locations thereof, so that desired images can be formed by projecting the diffracted light having the corresponding diffraction order onto the screen 126. Furthermore, the beams of the diffracted light having a plurality of diffraction orders, emitted from the diffractive light modulator 118, propagate at different diffraction angles.

The projection unit 120 includes a projection lens 121 and a scanner 122, and expands the linear diffracted light emitted from the diffractive light modulator 118, and scans the expanded diffracted light across the screen 126, thereby generating 2D images.

The projection lens 121 of the projection unit 120 expands the diffracted light having a plurality of diffraction orders emitted from the diffractive light modulator 118.

The scanner 122 of the projection unit 120 scans the linear diffracted light having a plurality of diffraction orders, expanded through the projection lens 121, across the screen 126, thereby forming 2D images.

A Galvanometer mirror or a polygon mirror may be used as the scanner 122.

A slot or dichroic filter may be used as the filter unit 124. The filter unit 124 passes diffracted light having a desired diffraction order therethrough, and blocks diffracted light having undesired diffraction orders, and does not require a Fourier lens.

That is, as described above, the beams of the diffracted light having a plurality of diffraction orders, emitted from the diffractive light modulator 118, propagate at different diffraction angles. When the filter unit 124 is located sufficiently far away from the diffractive light modulator 118, diffracted light having a plurality of diffraction orders enters the filter unit 124 with the shortest distance between beams of light having respective diffraction orders satisfactorily ensured such that they can be separated using a slot or dichroic filter, so that a Fourier lens is not required.

Meanwhile, the filter unit 124 may not be located downstream of the projection unit 120, unlike that in the embodiment of FIG. 3, but may be located downstream of the diffractive light modulator 118, as in the embodiment of FIG. 4. Here, the filter unit 124 includes a Fourier lens 124a and a Fourier filter 124b. The Fourier lens 124a functions to separate the diffracted light, having a plurality of diffraction orders, into beams of diffracted light having respective diffraction orders so that the shortest distance between the beams of light is satisfactorily ensured, while the Fourier filter 124b functions to pass only diffracted light having at least one desired diffraction order therethrough.

The distortion correcting means 125 makes the vertical distance from the center of an image formed on the screen 126 and the vertical distance from each side edge of the image the same by compensating for image distortion, thereby preventing image distortion.

A f·θ scan lens, which has a specific refractive index with respect to the θ optical axis and which focuses diffracted light on a projection surface by deflecting the diffracted light having equiangular velocity, reflected from the scanner 122, in a principal scanning direction and correcting aberration, can be used as the distortion correcting means 125. In this case, distortion can be corrected by dividing a scanning angle by n and assigning different focal distances to respective divided angles.

Furthermore, the distortion correcting means 125 and the screen 126 may be integrated into a high-luminance screen, and image distortion can be corrected using the high luminance screen.

According to the above-described present invention, when the linear diffracted light generated by the diffractive light modulator is projected onto the screen using the scanner, there is an advantage in that image distortion occurring at the center and side edges of the screen can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display device using a single-panel diffractive light modulator, comprising:
    a light source unit comprising a plurality of light sources for respectively emitting beams of light having respective wavelengths;
    a condensing unit for causing the beams of light, emitted from the plurality of light sources, to have an identical light path;
    an illumination unit for converting the light, emitted from the light sources of the light source unit, into linear light;
    a diffractive light modulator for generating diffracted light having a plurality of diffraction orders by modulating the linear light when the linear light enters from the illumination unit, so that diffracted light having at least one diffraction order, which will be used in an application, has light intensity values suitable for the application at respective locations thereof;
    a projection unit for projecting the diffracted light having a plurality of diffraction orders, emitted from the diffractive light modulator, onto the screen and generating images;
    a filter unit for passing diffracted light having at least one desired diffraction order, which is selected from the diffracted light having a plurality of diffraction orders and is used in the application, therethrough; and
    distortion correcting means for correcting image distortion that is caused upon projection of the diffracted light onto the screen by the projection unit.

2. The display device as set forth in claim 1, wherein the projection unit comprises:
    a projection lens for expanding the diffracted light having a plurality of diffraction orders, emitted from the diffractive light modulator; and
    a scanner for scanning the diffracted light, entering from the projection lens, across a screen.

3. The display device as set forth in claim 2, wherein the scanner is a Galvanometer mirror.

4. The display device as set forth in claim 2, wherein the scanner is a polygon mirror.

5. The display device as set forth in claim 1, wherein the filter unit is disposed between the projection unit and the screen, and passes diffracted light having at least one desired diffraction order, selected from the diffracted light having a plurality of diffraction orders projected by the projection unit, therethrough.

6. The display device as set forth in claim 1, wherein the filter unit is located downstream of the diffractive light modulator, and passes diffracted light having at least one desired diffraction order, selected from the diffracted light having a plurality of diffraction orders projected by the projection unit, therethrough.

7. A display device using a single-panel diffractive light modulator, comprising:

- a light source unit comprising a plurality of light sources for respectively emitting beams of light having respective wavelengths;
- a condensing unit for causing the beams of light, emitted from the plurality of light sources, to have an identical light path;
- an illumination unit for converting the light, emitted from the light sources of the light source unit, into linear light;
- a diffractive light modulator for generating diffracted light having a plurality of diffraction orders by modulating the linear light when the linear light enters from the illumination unit, so that diffracted light having at least one diffraction order, which will be used in an application, has light intensity values suitable for the application at respective locations thereof;
- a projection unit for projecting the diffracted light having a plurality of diffraction orders, emitted from the diffractive light modulator, onto the screen and generating images;
- a filter unit for passing diffracted light having at least one desired diffraction order, which is selected from the diffracted light having a plurality of diffraction orders and is used in the application, therethrough;
- distortion correcting means for correcting image distortion that is caused upon projection of the diffracted light onto the screen by the projection unit; and
- wherein the distortion correcting means is an f·θ scan lens that has a specific refractive index with respect to a θ optical axis and that focuses diffracted light on a projection surface by deflecting the diffracted light having equiangular velocity, reflected from the scanner, in a principal scanning direction and correcting aberration.

8. A display device using a single-panel diffractive light modulator, comprising:

- a light source unit comprising a plurality of light sources for respectively emitting beams of light having respective wavelengths;
- a condensing unit for causing the beams of light, emitted from the plurality of light sources, to have an identical light path;
- an illumination unit for converting the light, emitted from the light sources of the light source unit, into linear light;
- a diffractive light modulator for generating diffracted light having a plurality of diffraction orders by modulating the linear light when the linear light enters from the illumination unit, so that diffracted light having at least one diffraction order, which will be used in an application, has light intensity values suitable for the application at respective locations thereof;
- a projection unit for projecting the diffracted light having a plurality of diffraction orders, emitted from the diffractive light modulator, onto the screen and generating images;
- a filter unit for passing diffracted light having at least one desired diffraction order, which is selected from the diffracted light having a plurality of diffraction orders and is used in the application, therethrough;
- distortion correcting means for correcting image distortion that is caused upon projection of the diffracted light onto the screen by the projection unit; and
- wherein the distortion correcting means and the screen are integrated into a high-luminance screen.

* * * * *